PATENTED MAY 23 1972
3,664,349
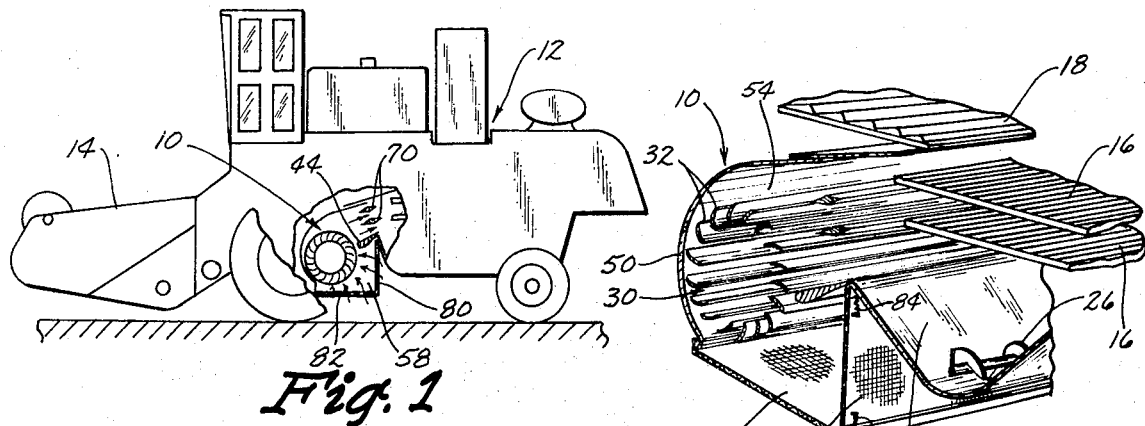
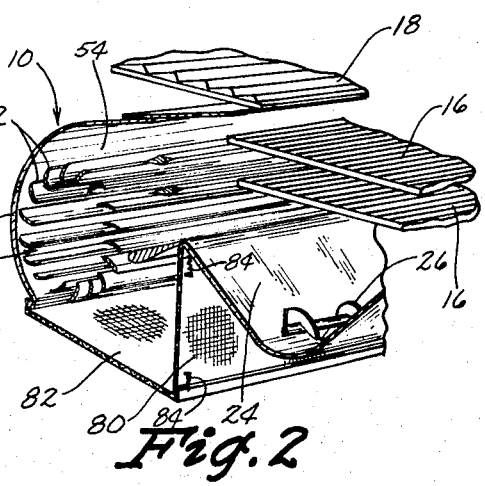
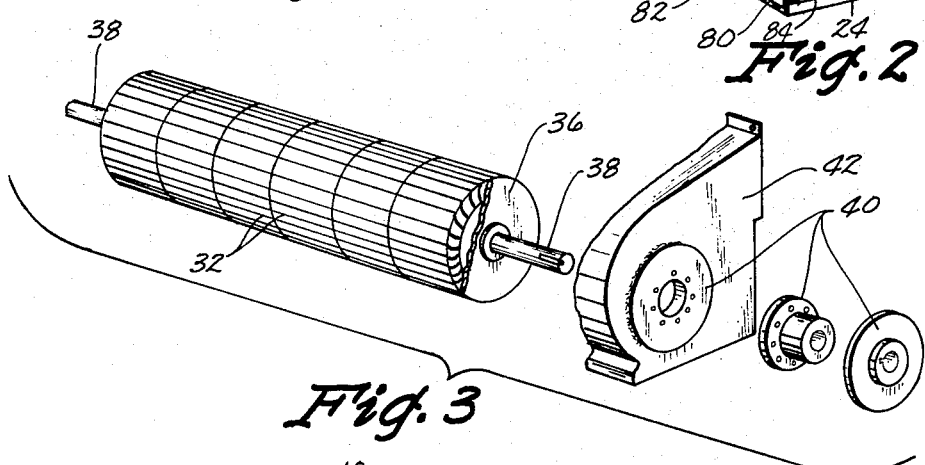
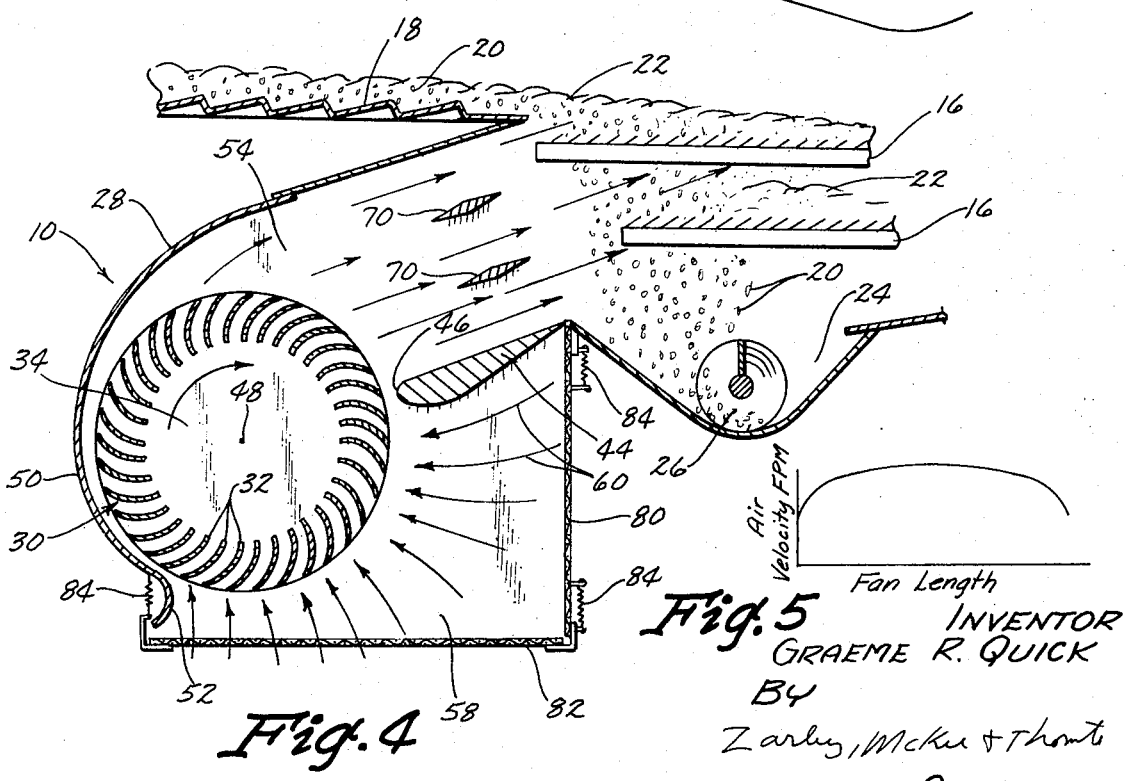
INVENTOR
GRAEME R. QUICK
BY
Zarley, McKee & Thomte
ATTORNEYS

United States Patent
Quick

[15] 3,664,349
[45] May 23, 1972

[54] COMBINE CLEANING BLOWER

[72] Inventor: Graeme R. Quick, Ames, Iowa

[73] Assignee: Iowa State University Research Foundation, Ames, Iowa

[22] Filed: Dec. 19, 1969

[21] Appl. No.: 886,471

[52] U.S. Cl. ........................................130/27 HF, 415/54
[51] Int. Cl. .................................................A01f 12/44
[58] Field of Search ..................130/24, 26, 27 R, 27 HF; 415/54

[56] References Cited

UNITED STATES PATENTS

| | | | |
|---|---|---|---|
| 2,849,118 | 8/1958 | Ashton | 130/24 |
| 3,258,195 | 6/1966 | Laing | 415/54 |
| 3,437,262 | 4/1969 | Eck et al. | 415/54 |
| 3,469,773 | 9/1969 | Pool et al. | 130/27 R |

*Primary Examiner*—Antonio F. Guida
*Attorney*—Zarley, McKee & Thomte

[57] ABSTRACT

A combine having grain cleaning sieves and a grain trough therebelow. A cross-flow fan is provided to blow air across the sieves and the fan includes an elongated hollow rotor having forwardly curved peripherally disposed spaced apart blades. A vortex regulator vane having an air foil cross-section is provided on one side between the inlet and the outlet opening and a housing wall is on the opposite side of the rotor. The leading edge of the air foil is closely adjacent the rotor in a radial plane through the longitudinal axis of the rotor. The housing wall extends partially around the rotor and is spaced progressively farther away from the inlet opening to the outlet opening. Vertically and horizontally disposed screens cover the inlet opening and are secured to the housing by springs to permit movement thereof and thereby maintaining them free of foreign material.

8 Claims, 5 Drawing Figures

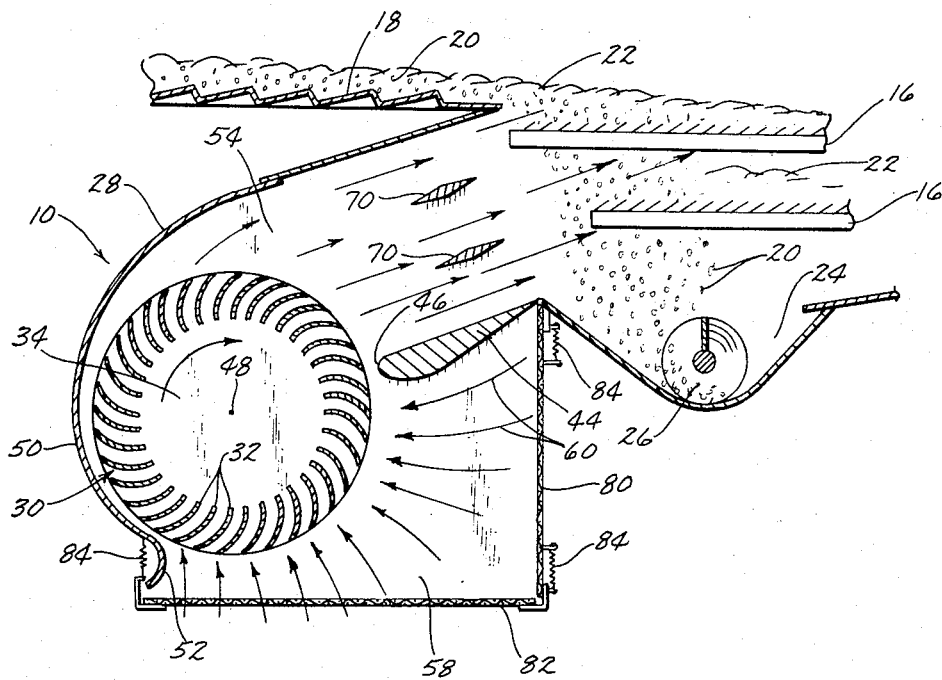

COMBINE CLEANING BLOWER

The larger combines being used currently are in need of substantially greater cleaning capacities for grain being handled. An increase in the cleaning capacity may be accomplished by increasing the width of the cleaning sieves but this should also involve the increase in the fan capacity.

A conventional centrifugal or paddle type fan provides a nonuniform flow output along its length with the greatest output being at its opposite ends and thus the longer the fan the less the output in the midsection thereof. A centrifugal fan draws the air in from the ends and is closed along its length except for the outlet opening.

Accordingly, a substantially longer fan is required for combines being currently used and the fan heretofore available are unable to satisfy the increased fan requirement demands.

The cleaning fan of this invention will provide a uniform stream of air across the width of the cleaning section of the combine or of a windrower machine. The greater the width of the cleaning section the more effective the fan of this invention is since the output is uniform in the midsection of the fan.

The cleaning fan of this invention for the same air volume output can be fifty percent smaller in size than a centrifugal type fan and the reduction in size can be in the vertical height which is very important in combine applications since the overall height of the combine can be reduced. The fan of this invention readily lends itself to the use of screens over the inlet to prevent the ingress of straw in the inlet. This fan also is more efficient and requires less power to drive it.

Also, this fan is more readily adapted to the shape of the combine or windrower and its drive assembly.

The screen covering the inlet may be flexible to allow the particles of straw and other foreign material tending to collect thereon to fall away from the inlet as the screens move through vibrations.

The fan of this invention is completely hollow along its longitudinal axial center and includes a rotor having forwardly curved peripherally disposed spaced apart blades. A vortex regulator baffle having an air foil cross sectional shape is provided with the leading edge closely adjacent to the periphery of the rotor while the opposite side of the rotor is partially enclosed by the housing wall which is closely spaced at the inlet opening to the fan and increases in its spacing towards the outlet opening which is in communication with the grain sieves.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary side elevation view of a combine employing the cleaning blower fan of this invention.

FIG. 2 is a fragmentary perspective view of the fan and its relationship to the vortex regulator and grain sieves.

FIG. 3 is a fragmentary exploded view of the fan and stub shaft bearing mounting.

FIG. 4 is an end elevation view showing the fan in operation.

FIG. 5 is a graph showing the output air velocity distribution along the length of the fan.

The fan of this invention is referred to generally in FIG. 1 by the reference numeral 10 and is shown mounted on a self-propelled combine 12 having a header 14. As seen in FIG. 2 the combine 12 includes a pair of spaced apart sieves 16 which receive grain and chaff from grain pans 18. The grain 20 and the chaff 22 move downwardly over the sieve 16 into the trough 24 having an augur 26. The chaff 22 remains on the sieve 16 in the path of the air being blown through the sieves by the fan 10 which includes a housing 28 in which a rotor 30 is positioned. The rotor is defined by a plurality of closely spaced forwardly curved peripherally disposed blades 32 which in turn define an elongated opening 34 through the center of the rotor. End plates 36 having stub shafts 38 connected thereto are provided for being received in bearing assemblies 40 in opposite end walls 42 of the housing 28. The rotor 30 is positioned in a radially extending plane passing through the axial center 48 of the rotor. The opposite side from the vortex regulator includes a side wall 50. The side wall 50 has an inlet end 52 closely spaced to the rotor 32 and increasing in its spacing therefrom towards the outlet opening 54.

The opposite side of the rotor from the wall 28 includes the vortex regulator 44 having an air foil cross-section with its forward edge 46 being closely adjacent to the outer periphery of the rotor 30 and being positioned in a radial plane through the axial center 48 of the rotor 30. It is seen that the rear end of the air foil regulator terminates with the trough 24 housing in FIG. 4. An inlet screen hereinafter described also is connected to the housing at the rear of the vortex regulator such that the entire vortex regulator is exposed to the atmosphere.

The inlet opening 58 for the fan 10 is defined as a space between the wall portion 52 and the vortex regulator 44.

The operation of the cross-flow fan is such that the air volume and velocity is the greatest on opposite sides of the vortex regulator 44 and thus the velocity and volume is indicated by the length of the arrows 60 in FIG. 4. It is seen that the velocity and volume of air diminish uniformly around the rotor away from the vortex regulator 44.

A pair of guide vanes are positioned in the passageway between the fan outlet 54 and the sieves 16 and include forward and rearward tapered top and bottom edges and thus appear uniform in cross-section, front and rear. These vanes 70 may be adjusted accordingly to direct the air onto the sieves.

Thus it is seen in operation that the cleaning fan of this invention in a combine draws in air on the inlet side 58 along its full length at the outer circumference or periphery of rotor 30. The air hits the blade ring twice and then is forced out on the opposite side through the outlet 54. The inlet and outlet axes are approximately at right angles to each other. Since there is no axial component of flow, there is no theoretical limit to rotor length, which may be chosen to fit any width of duct. The longer rotors enjoy the fullest benefit of the uniform velocity distribution as indicated in the graph in FIG. 5 which shows air velocity FPM versus fan length. It is seen that the air velocity is high in the midsection and drops off at the ends. Encasing the end disks 36 in the fan housing such that the rotor 30 is slightly wider than the duct aids further in diminishing end effects.

The theory of operation which best fits the observed flow through the fan is that a "combined vortex" is generated by the rotating impellor i.e., a forced vortex in the region of the vortex center, surrounded by a free vortex, with its hyperbolic velocity distribution. The flow regime through the impellor can be controlled. The location of the center and strength of the vortex may be governed by the "vortex regulator" of "cut-off". The vortex center assumes a preferred position inside the rotor, dependent on the shape of the housing and cut-off and its location does not change with the speed of the rotor.

The input air may be maintained in a clean state through use of vertically and horizontally disposed flexible screens 80 and 82 secured to the housing by springs 84 which will enable the screens to vibrate and cause the chaff and other foreign material to shake loose and allow air to pass into the inlet 58. The screens are positioned below and to the rear of the fan as is shown in FIG. 1.

Among the many advantages of this cleaning fan is that a nine inch fan of the design of this invention will produce a similar open discharge as an 18 inch diameter conventional combine blower at similar speeds. It is important if possible to eliminate any center shaft or discs in the rotor since such a unit will have an output of approximately thirteen percent below that of the shaftless rotor.

In view of the foregoing it is apparent that the longer the rotor the greater the advantages over the conventional paddle wheel type blower which is characterized by ragged and uneven velocity distribution including the greatest velocity at the ends with the lowest velocity being along the midsection which is just the opposite of the characteristics of the fan of this invention. Thus as combines become wider and wider the advantages of the cleaning blower of this invention become more important.

In summary, the advantages for the cleaning blower of this invention are that a uniform velocity profile across the fan section may be accomplished and an unlimited width possibility exists for the fan. The higher velocities in the center may be used to advantage. The fan of this invention is simpler in structure and has less components. There are no side inlets and therefore the fan is not affected by side winds. The fan is much more compact and has a substantially lower profile which takes up fifty percent less head room. The inlet and outlet may be rectangular in shape. The inlet also lends itself to the use of a simple screen structure to prevent trash ingress. The rotor may be practically half the diameter for a similar velocity conventional fan at a similar rotational speed. Lastly, the noise level is actually lower with this fan.

I claim:

1. In a combine having cleaning sieves and a grain collecting trough therebelow,
an elongated fan means having a housing including and inlet opening along its substantial length and an outlet opening along its substantial length and in communication with said cleaning sieves,
said fan including a rotor having forwardly curved peripherally disposed spaced apart blades and the longitudinal center of said rotor being substantially open throughout its length,
said rotor having axial end plates substantially closing the ends of said rotor,
stub shaft means connected to said end plates rotatably mounting said rotor in said housing, and
a vortex regulator baffle provided between said inlet and outlet openings, said baffle having an edge positioned closely adjacent the periphery of said rotor along its substantial length whereby inlet and outlet flows of air take place perpendicularly to the axis of the rotor and the streamlines of the air passing through the rotor interior represent a two dimensional flow field and the air passes twice through the blades in each revolution; said housing includes a screen extending over said inlet opening and disposed at least in part beneath said rotor.

2. The structure of claim 1 wherein said housing includes a wall extending partially around said rotor on the opposite side thereof from said vortex regulator and said housing being spaced progressively farther away from said rotor from the inlet opening to said outlet opening.

3. The structure of claim 2 wherein said rotor vanes are exposed in said inlet opening to the atmosphere from said wall to said vortex regulator, and said air velocity through said rotor is the highest on opposite sides of said vortex regulator and diminishes outwardly in opposite directions around said rotor from said vortex regulator to said wall.

4. The structure of claim 3 wherein the length of said rotor is at least three times its diameter and substantially uniform output air volume and velocity occurs along the substantial midsection of said rotor in said outlet opening and the output air volume and velocity at said midsection is greater than at the opposite ends of said rotor.

5. The structure of claim 4 wherein said sieves are substantially as long as said rotor along the side adjacent said fan.

6. The structure of claim 5 wherein said screen is yieldably secured to said housing whereby movement of said screen will tend to keep foreign material from becoming attached to said screen and closing it.

7. The structure of claim 6 wherein said screen includes screen sections disposed at substantially right angles and oriented in horizontal and vertical planes, and each of said screen sections being yieldably secured to said housing.

8. The structure of claim 5 wherein said vortex regulator baffle is an air foil in cross section with said edge adjacent said rotor being the leading edge of said air foil, and said air foil being disposed in a plane extending substantially radially through the axial center of said rotor.

* * * * *